(12) United States Patent
Gomez (10) Patent No.: US 9,387,934 B2
(45) Date of Patent: Jul. 12, 2016

(54) METHOD AND A ROTARY WING AIRCRAFT HAVING THREE ENGINES

(71) Applicant: AIRBUS HELICOPTERS, Marignane (FR)

(72) Inventor: Nayibe Gomez, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 356 days.

(21) Appl. No.: 14/084,877

(22) Filed: Nov. 20, 2013

(65) Prior Publication Data

US 2014/0145028 A1 May 29, 2014

(30) Foreign Application Priority Data

Nov. 26, 2012 (FR) ...................................... 12 03181

(51) Int. Cl.
| | | |
|---|---|---|
| *B64D 31/06* | (2006.01) | |
| *B64C 27/12* | (2006.01) | |
| *B64D 31/00* | (2006.01) | |
| *B64D 35/08* | (2006.01) | |
| *B64C 27/14* | (2006.01) | |

(52) U.S. Cl.
CPC ................. *B64D 31/06* (2013.01); *B64C 27/12* (2013.01); *B64C 27/14* (2013.01); *B64D 31/00* (2013.01); *B64D 35/08* (2013.01)

(58) Field of Classification Search
CPC ........ B64D 35/08; B64D 31/06; B64D 41/00; B64C 27/12
See application file for complete search history.

(56) References Cited

U.S. PATENT DOCUMENTS

| | | | |
|---|---|---|---|
| 3,963,372 A | 6/1976 | McLain et al. | |
| 4,479,619 A | 10/1984 | Saunders et al. | |
| 8,283,796 B2 | 10/2012 | Certain | |
| 2009/0186320 A1 | 7/2009 | Rucci et al. | |
| 2010/0013223 A1* | 1/2010 | Certain .................... | B60K 6/24 290/31 |
| 2013/0184958 A1* | 7/2013 | Dyrla ....................... | B60K 6/00 701/99 |
| 2013/0219905 A1 | 8/2013 | Marconi et al. | |

FOREIGN PATENT DOCUMENTS

| | | |
|---|---|---|
| EP | 2033893 A2 | 3/2009 |
| FR | 2933910 | 1/2010 |
| WO | 2012059671 | 5/2012 |

OTHER PUBLICATIONS

Korean Office Action KR 10-2013-0144906; dated Feb. 9, 2015; 3 pages, English Translation.
Search Report for FR 1203181, Completed by the French Patent Office on Jun. 19, 2013, 7 Pages.
Chinese Office Action Translation Dated Aug. 18, 2015, Application No. 201310610733.2, Applicant Airbus Helicopters, 12 Pages.

\* cited by examiner

*Primary Examiner* — Nicholas McFall
(74) *Attorney, Agent, or Firm* — Brooks Kushman P.C.

(57) ABSTRACT

An aircraft (1) having a rotary wing (2) and at least one main gearbox (5) for driving rotation of said rotary wing (2), said aircraft (1) having a first main engine (11) and a second main engine (12) driving said main gearbox (5), said aircraft (1) being provided with a main regulation system (15) regulating the first main engine (11) and the second main engine (12) in application of a setpoint that is variable. A secondary engine (21) is also capable of driving said main gearbox (5), said aircraft (1) having a secondary regulation system (25) that regulates the secondary engine (21) in application of a setpoint that is constant and that is independent of said main regulation system (15).

21 Claims, 2 Drawing Sheets

METHOD AND A ROTARY WING AIRCRAFT HAVING THREE ENGINES

CROSS REFERENCE TO RELATED APPLICATION

This application claims priority to French patent application No. FR 12 03181 filed on Nov. 26, 2012, the disclosure of which is incorporated in its entirety by reference herein.

BACKGROUND OF THE INVENTION (1) Field of the Invention

The present invention relates to a rotary wing aircraft having three engines, and to a method of controlling the aircraft.

It should be observed that the term "engine" is used to mean a power unit contributing to providing the aircraft with propulsion and/or lift. For a rotary wing aircraft, the term "engine" is used to designate a power unit that drives rotation of a main gearbox that in turn drives rotation of at least one rotor of the rotary wing.

(2) Description of Related Art

An aircraft is sometimes fitted with an auxiliary power unit (APU). Such an auxiliary power unit may be used for example to generate electricity, to drive hydraulic systems, or indeed to contribute to starting an engine. In contrast, the auxiliary power unit does not drive a main gearbox of a rotor on a rotary wing aircraft.

Consequently, the APU of an aircraft does not constitute an "engine" in the meaning of the invention.

The invention thus comes in the field of power plants for rotary wing aircraft, such as helicopters, for example.

By construction, the level of power that can be delivered by an engine is limited. Under such circumstances, when the power from a single engine is found to be insufficient, manufacturers naturally arrange a plurality of engines on an aircraft.

Installing a larger number of engines on airplanes provides the opportunity to improve the safety of such airplanes. Four-engined airplanes constitute a design that is advantageous for specific missions of crossing oceans or of taking off and landing on short runways.

Nevertheless, in order to reduce complexity and costs, the modern trend is to reduce the number of engines while still performing missions of the same type.

This trend is identical with aircraft having a rotary wing.

For example, three-engined aircraft appeared in the 1960s because of the lack of power of the engines that were available at that time on aircraft presenting heavy weight.

In the heavy category, three-engined rotary wing aircraft are still advantageous for satisfying the increasing requirements of operators in terms of safety. These requirements seek in particular to ensure that a flight is safe regardless of the instant at which an engine failure might occur. Specifically, certain operators desire to be able to continue performing hovering flight in a heavy rotary wing aircraft even if one engine has failed.

Three-engined rotary wing aircraft are fitted with three identical engines. Engines are said to be "identical" when they have identical characteristics for driving a rotary member.

Conversely, engines are referred to as "unequal" when they have different drive characteristics, in particular engines that generate different maximum powers, and/or unequal maximum torques, and/or different maximum speeds of rotation for an outlet shaft. Thus, two unequal engines may correspond respectively to an engine driving an outlet shaft at several tens of thousands of revolutions per minute (rpm), and an engine driving an outlet shaft at less than ten thousand revolutions per minute.

Installing a plurality of engines that are identical was required for the purpose of ensuring responsiveness in the event of one engine failing and also for simplifying the installation and the integration of the engine. Nevertheless, it is always possible to install engines having unequal maximum powers in order to satisfy safety requirements or in order to mitigate the lack of power of engines available on the market.

Nevertheless, the technical challenges that need to be solved have prevented industrialization of any three-engined helicopter architecture that has for example one engine of maximum power different from the maximum power of the others.

In order to design a three-engined rotary wing aircraft having engines that are identical, a manufacturer needs mainly to overcome the technical challenges set out below.

Thus, the engines need to be overdimensioned in order to satisfy safety requirements and be capable of delivering extra power in the event of an engine failing. So-called one-engine inoperative (OEI) contingency ratings are implemented. Dimensioning for such excess power levels is very penalizing and incompatible with optimizing an engine in terms of its weight, its cost, its fuel consumption, and its emissions (noise, $CO_2$, ... ) in particular. It is also very complicated for such engines to be certified since they require additional testing such as specific endurance or "over-temperature" tests.

Furthermore, the engines need to be regulated depending on their utilization.

Aircraft are thus known in which all the engines are regulated as a function of a setpoint that is constant.

Alternatively, and in accordance with present practice, in a multi-engined aircraft, all of the engines are regulated with respect to a setpoint that is variable. For example, the engines are regulated with respect to a setpoint speed of rotation for a free turbine, with this setpoint varying as a function of the power to be delivered or indeed as a function of the density of the surrounding air, in particular.

The engines thus generally co-operate with a control unit, either of the kind known as an engine control unit (ECU), or else of the kind known as a full authority digital engine control (FADEC) unit.

The control unit of any one engine conventionally communicates with the other control units. The engines are thus all regulated as a function of the same variable setpoint.

The setpoint on which engines are regulated varies in particular in order to avoid overspeed of the rotary wing or of an engine.

The power needed on the ground is less that the power needed to take off. As a result, the control units act for example to limit the performance of engines in order to avoid overspeed of the rotary wing.

Conversely, during hovering flight, it is appropriate to avoid overspeed of the engines.

Under such circumstances, integrating three engines may involve control units of considerable size and weight. Compared with a twin-engined aircraft, the number of inputs/outputs in a control unit can be increased significantly, and it is necessary to harmonize communication between the various pieces of equipment.

In addition, the control systems of an aircraft and its engines may excite resonant modes of vibration in a rotary wing aircraft. The complexity of developing torsional stability in the power drive train of the aircraft increases with the number of elements that contribute to the overall drive train, and thus with the number of engines installed.

A good compromise between the reactivity of an engine in response to a command for the pilot and the stability of the aircraft also constitutes a major challenge to overcome. If the engines are very reactive, a rapid command from a pilot runs the risk of exciting a resonant mode of vibration of the aircraft. Given that developing a twin-engined aircraft is difficult, it can be understood that developing an aircraft having three reactive engines is even more difficult.

In order to optimize the operating point of the engines, a power plant having engines of maximum powers that are not equal could be envisaged.

For twin-engined operation, such an installation and its benefits are explained in document WO 2012/059671 A2.

Nevertheless, installing engines having unequal maximum powers involves major technical challenges. Under such circumstances, such a solution would appear to be difficult to implement on a three-engined aircraft.

In particular, the reactivity of such an aircraft can be difficult to optimize.

For example, on a conventional helicopter, the engines are balanced so that the power delivered by each engine is the same.

For an engine with pure proportional regulation, balancing engine power, i.e. "load sharing" is provided by means of a predefined relationship associating the speed of rotation of a gas generator of the engine with the speed of rotation of a rotor providing the helicopter with lift and propulsion. For an engine having proportional-integral regulation that takes account of power parameters (speed of rotation of the gas generator NG, temperature TOT, or indeed torque TRQ) of the other engines in the regulation loop, power balancing is performed by a control unit.

The reactivity of an aircraft having engines that develop equal powers can be better than that of an aircraft having engines that develop unequal powers.

In an aircraft having two engines developing equal powers, each engine delivers half of the required power. If one engine fails, it is then appropriate to accelerate the other engine in order to obtain an increase in power equal to half of the required power.

However, if the engines have unequal maximum powers, the loss of the higher power engine needs to be compensated as quickly as possible by the lower power engine. The lower power engine then needs to be accelerated so as to increase its power by more than half of the power required, given the unbalance.

Furthermore, it can be difficult to control the aircraft under such conditions.

In a conventional helicopter, the engines are regulated so that their free turbines have the same speed of rotation NTL, which speed is variable and proportional to the speed of rotation NR of the lift rotor. As explained above, they are also regulated to deliver identical power.

If the engines have unequal maximum powers, new control logic without power balance would appear to be difficult to develop for the purpose of managing the overall power to be delivered (i.e. the power available from each of the engines, its limits, the power required, etc.).

Furthermore, with engines that do not present identical maximum powers, their speeds of rotation may also be different, and that constitutes another difficulty. Such power management may be even more complex if it is decided to stop one engine in order to improve fuel consumption.

The stability of the aircraft is even more problematic in the presence of three engines of unequal maximum power.

The dynamic behaviors of the engines having different maximum powers can be different. However, information relating to the operation of the engines is exchanged and compared among the controls units. Consequently, unequal engines can be subjected to asymmetrical accelerations giving rise to false alarms concerning transient faults.

The torsional stability of the power transmission drive train of the aircraft can also represent a problem that is difficult to overcome.

Furthermore, it can be difficult to monitor the engines, since unequal engines are difficult to compare with one another.

In addition, if unequal engines are used, an aircraft manufacturer might possibly contact different engine manufacturers for making different engines of a given aircraft.

This might result in difficulties in harmonizing the interfaces between the engines, or between the engines and the remainder of the aircraft.

It can thus be understood that developing a three-engined aircraft ought to be advantageous.

However, implementing three engines that are identical can lead to difficulties in dimensioning the engines and their control units, and also to problems of stability.

Implementing unequal engines appears to be even more difficult, since it gives rise to problems of reactivity, control, stability, monitoring, or indeed integration.

Whatever the variant, making a three-engined aircraft thus gives rise to a variety of difficulties. These difficulties make provision of a three-engined aircraft non-obvious, since a three-engined aircraft is not merely a twin-engined aircraft provided with a third engine.

The technological background includes document U.S. Pat. No. 4,479,619, which proposes a power transmission system for three-engined helicopters.

That solution also proposes the alternative of declutching one out of three engines.

The Super-Frelon helicopter also had three identical engines (without clutching).

Document U.S. Pat. No. 3,963,372 proposes a power management and control solution for the engines of three-engined helicopters. A central unit controls the engines in order to equalize the powers at the outlet from the engines.

In order to mitigate the problems of engines designed so as to be overdimensioned, a power plant having engines with unequal maximum powers for twin-engined aircraft has already been proposed in the past. This applies to document WO 2012/059671 A2, which proposes two engines of unequal maximum powers.

That document WO 2012/059671 A2 deals only with twin-engined aircraft and it does not present solutions to the problems of control or stability.

Document FR 2 933 910 describes a power plant having at least one turboshaft engine and at least one electric motor.

Document US 2009/186320 describes three engines controlled by FADECs that are connected together and to a control member referred to as the "flight control computer (FCC)".

BRIEF SUMMARY OF THE INVENTION

An object of the present invention is thus to propose a novel rotary wing aircraft having three engines, e.g. in order to be capable of remaining in hovering flight even if one engine has failed.

According to the invention, an aircraft is provided with a rotary wing and at least one main gearbox for driving rotation of the rotary wing. In addition, the aircraft has a first main engine and a second main engine for driving the main gearbox, the aircraft being provided with a main regulation system regulating the first main engine and the second main engine in application of a setpoint that is variable.

This aircraft is also provided with a secondary engine driving the main gearbox, the aircraft having a secondary regulation system that regulates the secondary engine in application of a setpoint that is constant, the secondary regulation system being independent of said main regulation system.

Compared with a twin-engined aircraft, the invention provides the advantage of additional power. In the event of a main engine failing, the power plant can nevertheless deliver a relatively high level of power in order to make the flight of the aircraft safe.

For example, when a main engine fails, it is possible with the invention to obtain power that is substantially equivalent to the power obtained on a conventional twin-engined aircraft operating at a maximum continuous power (MCP) rating.

In addition, the extra power delivered by the secondary engine might make it possible to avoid overdimensioning the main engines, in particular for the purpose of providing hovering flight even if one of the main engines has failed.

A twin-engined helicopter is often designed for three contingency ratings known by the acronyms OEI, OEI 2', OEI 30" that are associated with high power levels. The invention may possibly make it possible to implement a single contingency rating, thus avoiding overdimensioning to an extent that is penalizing.

In addition, this novel aircraft can make it possible to overcome at least some of the above-mentioned drawbacks.

The two main engines and the secondary engine are controlled differently regardless of the stage of flight. The secondary engine is regulated on a target that is constant, within the limit of the flight envelope of the helicopter, regardless of air density, and regardless of the necessary power demand generated by the pilot moving the flight controls.

The secondary engine may be an electric motor or a fuel-burning engine.

Under such circumstances, and in the absence of any variable regulation target, the secondary engine serves to reduce the power that needs to be delivered by the main engines in order to satisfy the needs of the rotary wing. It is shown below that the secondary engine delivers either a single power level during fixed power regulation, or else power that is substantially constant during fixed fuel flow rate regulation, for example.

Under such circumstances, the main engines deliver the remaining power required for satisfying the needs of the rotary wing.

If necessary, the main engines may be regulated so that they deliver no power. For this purpose in particular, the main engines are therefore controlled using a regulation target that is variable.

These two main engines can thus operate in the same manner as the engines of a conventional twin-engined aircraft. The main regulation system then operationally regulates the free turbine speed NTL of these main engines as a function of a variable setpoint given by an avionics system of the aircraft.

Furthermore, the main regulation system may regulate one main engine relative to the other main engine. For example, the main engines may be balanced so as to present a difference of no more than 5% between the speeds of rotation of their gas generators, and a difference of no more than 15% between the torques transmitted by those main engines.

In contrast, in order to simplify the device, no information is exchanged about power between the secondary engine and the main engines. Likewise, state information and operating parameters of the secondary engine are not necessarily exchanged with the state information and the operating parameters of the main engines.

If the main and secondary engines are equal, then the aircraft corresponds to an aircraft having three equal engines that will be exposed to difficulties of dimensioning the engines and of their control units, and also to problems of stability.

However, the presence of the secondary engine can make it possible avoid overdimensioning the main engines.

In addition, given the explanations above, in the absence of any connection between the main regulation system and the secondary regulation system, the aircraft may be provided with control units that may be of dimensions and costs that are reasonable, like a twin-engined aircraft.

For example, in one embodiment, the main regulation system comprises a first main control for controlling the first main engine and a second main control unit for controlling the second main engine, the first main control unit communicating with the second main control unit. The secondary regulation system then includes a secondary control unit for controlling the secondary engine, the secondary control unit possibly having no connection with the main control unit.

The main control units may be of the FADEC type as used in twin-engined helicopters. The number of inputs and outputs of those control units thus remains small.

In contrast, the secondary control unit may be simpler in order to satisfy a regulation target that is constant. For example, the secondary control unit may be of the hydromechanical type.

In another variant, the main control units and the secondary control units may all be of the FADEC type. Alternatively, the main control units and the secondary control units may all be of the hydromechanical type.

Concerning the stability of the aircraft, the secondary engine is controlled to comply with a fixed target, which can diminish its impact on the torsional stability of the power transmission drive train of the aircraft.

Furthermore, the secondary engine may present a reaction time in acceleration or deceleration that is greater than the reaction time of the main engines.

The secondary engine is regulated on a target that is constant. Thus, a sudden command from the pilot leads to a change in the behavior of the main engines, as in a twin-engined aircraft, in order to respond to the order from a pilot or from autopilot means.

Consequently, and surprisingly, the secondary engine may possess low reactivity. The reactivity of the secondary engine may therefore be well below the reactivity of the other two engines. The difference in reactivity between the main engine and the secondary engine may possibly be of the order of one second.

Low reactivity of the secondary engine implies that the impact of the secondary engine on the torsional stability of the power transmission power train is limited.

Furthermore, when the secondary engine possesses a reaction time in acceleration or in deceleration that is greater than the reaction time of the main engines, the operating line of the secondary engine can then be adapted to minimize the energy consumption of the secondary engine. With a fuel-burning engine, the fuel consumption of the secondary engine can thus be reduced.

Furthermore, the main and secondary engines may also be unequal.

For example, the main engines may be identical, while the secondary engine is different from the main engines.

In particular, the secondary engine may be of a different size and may have a different maximum power class compared with the two main engines. In particular, the secondary engine may develop maximum power that is less than the maximum power developed by each of the two main engines.

The aircraft is then exposed to the additional problems of response time in the event of an engine failing, of monitoring, or indeed of integration as mentioned above.

Nevertheless, the two main engines can be balanced by the main regulation system. Since the secondary engine is controlled in terms of a target that is constant, the response time of the power plant does not vary as a function of the failed engine. The response time corresponds to the response time of a main engine regardless of which engine has failed.

Concerning monitoring of the engines, the state information and the operating parameters of the secondary engine do not necessarily need to be exchanged with the main engine. The regulation of the main engines is independent of the secondary engine, and vice versa.

Consequently, monitoring of the power plant is made easier.

Finally, the main and secondary engines are indeed independent. The development of the main engines can thus be independent of the development of the secondary engine. Furthermore, there is no longer any need to harmonize the interfaces of all three engines, even if the secondary engine possesses maximum power that is not equal to the maximum powers of the main engines.

Furthermore, regardless of whether the three engines are equal or unequal, the invention is easily transposable to a twin-engined aircraft. The operation of the main engines of the twin-engined type remains practically unchanged in spite of adding a secondary engine.

Furthermore, it is possible to propose selecting the secondary engine from a list of engines depending on requirements. Since the regulation of the main engines is independent of the regulation of the secondary engine, selecting any given secondary engine has little impact on the main engines.

This aircraft also makes it possible to cause the secondary engine to be operated as a function of the mission or as a function of parameters such as the forward speed of the aircraft.

If the secondary engine is started only at a low forward speed in order to increase safety during this stage of operation, fuel saving can be significant for optimized hovering performance and category A performance.

In a three-engined aircraft, the advantage was in optimizing the dimensioning of the two main engines (for purely twin-engined operating conditions). The savings in weight, simplicity, cost, fuel consumption, and gas emissions, can be considerable.

Furthermore, if the secondary engine is started only at a low forward speed, the reactivity of the helicopter can be optimized in the event of a failure of one of the main engines. The invention makes it possible to implement a single contingency rating that can be reached more quickly than some of the contingency ratings of the prior art.

Furthermore, in a three-engined aircraft with a secondary engine having maximum power that is not equal to that of the main engines, the invention makes it possible in the event of a failure of a main engine to deliver sufficient energy to the rotary wing to be able to perform complex and risky maneuvers such as landing.

Consequently, the proposed aircraft has two main engines that are controlled using a target that is variable, and a secondary engine that is controlled using a target that is constant in any given mode of operation.

This novel architecture makes it possible, surprisingly, to solve several of the technical problems encountered in certain three-engined aircraft.

The aircraft may also include one or more of the following characteristics.

In particular, a freewheel or a clutch is optionally interposed between each engine and the main gearbox.

The secondary engine is thus mechanically connected to the main gearbox either by means of a freewheel making it possible to avoid driving the secondary engine when the secondary engine is stopped (e.g. in the event of an engine failure), or by means of a clutch making it possible to activate the mechanical connection between the secondary engine and the main gearbox in the required configurations.

The secondary engine can then be connected to the main gearbox via a connection that includes a freewheel or a clutch.

This connection may be connected to a mechanical connection that connects a main engine to the main gearbox, or it may be connected to a dedicated inlet of the main gearbox.

Furthermore, if the main gearbox has a plurality of speed reduction stages, the main engines may be connected to a first speed reduction stage, while the secondary engine is connected to a second speed reduction stage.

Each engine is then connected to the main gearbox via a reduction stage that is appropriate for the nominal operating range of that engine's outlet shaft.

Also, in a variant, it should be recalled that each main engine need have only one contingency operating rating.

The secondary engine may have at least two operating ratings, each regulated as a function of a respective fixed setpoint that is constant.

The secondary engine is then regulated relative to a target that is constant and that corresponds to the rating in use.

For example, the secondary engine may deliver a plurality of target powers for use on different aircraft in a range of aircraft, or indeed in order to adapt to different missions on any one aircraft. There is then no longer any need to dimension the engines for the mission with the highest constraints, and which indeed is often the mission that is the least frequent.

In addition, the constant setpoint may optionally either be a fixed power setpoint or else a fixed fuel flow rate setpoint. For example, a fuel-burning secondary engine may be regulated to apply a fixed power setpoint or a fixed fuel flow rate setpoint. Likewise, a secondary engine that is an electric motor may be regulated to follow a fixed power setpoint, for example.

In a variant, the secondary engine is then regulated to constant objective power, within the limit of the flight envelope of the helicopter, regardless of the density of the air and regardless of the required power demand generated by the pilot by moving the flight controls.

In another variant, the secondary engine may be regulated to achieve a maximum fixed fuel flow rate position.

The power delivered by the secondary engine is then a function of parameters external to the aircraft such as outside pressure and temperature.

The fixed fuel flow rate position is equivalent to "freezing" a metering pump in a flow rate position that is sufficient for obtaining the necessary power at the dimensioning point of the aircraft.

This variant possesses the drawback of introducing variability in the power delivered by the secondary engine, since the power it delivers varies as a function of said parameters external to the aircraft.

However, the loop for regulating the secondary engine is simple. In addition, this variant gives rise to better control over fuel consumption.

Other variants are possible. For example, the secondary engine may be regulated so that its outlet shaft rotates at a speed of rotation that is substantially constant.

In a variant, the aircraft has means for deactivating the secondary engine.

The deactivation means can inhibit the secondary engine by stopping it, or indeed by making it operate at an idling speed. The deactivation means may have a plurality of positions relating to normal operation, to idling operation, to stopping the secondary engine, or indeed to contingency operation, for example.

The secondary engine may then be activated and deactivated as a function of the mission (e.g. it may be activated only if the mission is a flight of the search type), as a function of the terrain (e.g. if the terrain is encumbered), as a function of the forward speed of the helicopter (e.g. operating only at low speed), as a function of altitude (e.g. operating only at high altitude), or as a function of outside temperature (e.g. operating only at high temperature).

In a preferred first embodiment, the secondary engine develops maximum power that is insufficient for driving said rotary wing into overspeed when on the ground.

Under such circumstances, there is no risk of the secondary engine giving rise to the rotary wing being driven into overspeed on the ground.

The secondary engine can then be dimensioned so as to limit its maximum power to a power level that is less than the opposing torque exerted on the outlet shaft of the secondary engine. It will be understood that this opposing torque results from the combination of the opposing torque from the rotary wing plus the opposing torque from the main gearbox, and also the effect of inertia forces.

In a second embodiment, the secondary engine develops maximum power that is sufficient for driving the rotary wing into overspeed.

Under such circumstances, the aircraft may include detection means for detecting whether the aircraft is on the ground, said aircraft having inhibit means for inhibiting the secondary engine while it is on the ground.

By way of example, the detection means may comprise a radioaltimeter, or indeed a contactor arranged on landing gear in order to detect when the landing gear is in contact with the ground.

The secondary engine thus not operate on the ground, being stopped or idling, so as to ensure that the rotary wing is not put into an overspeed state.

In contrast, the secondary engine may be activated once the aircraft is in flight, i.e. when it is no longer standing on the ground.

During a takeoff stage, the secondary engine may be activated to drive the drive train when the aircraft is still within the ground effect. The takeoff procedure may then provide for an intermediate flight point for verification purposes.

If a malfunction occurs on takeoff prior to activating the secondary engine, the aircraft can land relatively easily without help from the secondary engine so long as the aircraft is still within the ground effect. The same applies while landing.

Furthermore, the aircraft may include a detection system for detecting whether the aircraft has a forward speed that is faster than a threshold forward speed and/or whether the rotary wing is exceeding a threshold speed of rotation, said aircraft having inhibit means for inhibiting the secondary engine when the aircraft possesses a forward speed that is faster than a threshold forward speed and/or when the rotary wing exceeds a threshold speed of rotation.

The detection system may then include conventional means for measuring the forward speed of the aircraft.

In addition, the detection system may also include means for measuring the speed of rotation of the rotary wing. By default, the detection system may evaluate and/or anticipate the power needed for driving the rotary wing, this needed power necessarily being less than the fixed power objective delivered by the secondary engine for driving the rotary wing in order to ensure that the rotary wing does not possess an excessive speed of rotation.

Thus, the secondary engine may operate when flying at low speed and/or so long as the power delivered by the secondary engine is less than the power needed for driving the rotary wing.

In a version of the first and second embodiments, the inhibit means include means for braking the secondary engine.

If the secondary engine possesses a constant maximum power target capable of leading to overspeed of the rotary wing on the ground or in flight, it is possible to introduce a variable opposing torque. The variable opposing torque is activated on the ground, but it might optionally be released when the pilot increases the collective pitch of the blades of the rotary wing. Such brake means may include a brake for braking the free turbine of the secondary engine. When the aircraft is no longer on the ground, this variable opposing torque may be activated so as to inhibit the secondary engine in application of the logic of the detection system. This makes it possible to detect whether the aircraft possesses a forward speed that is faster than a threshold forward speed and/or when the rotary wing exceeds a threshold speed of rotation and/or when the evaluation of the power needed by the rotary wing must be less than the fixed target power delivered by the secondary engine.

In a version of the second embodiment, a freewheel is interposed between the secondary engine and the main gearbox, and the inhibit means include means for causing said secondary engine to idle or to stop. For example, the secondary engine may be stopped or caused to idle when the power needed for driving the rotary wing is less than the available power delivered by the secondary engine.

In this version, the freewheel does not prevent the rotary wing being driven by the secondary engine. The secondary engine is then stopped or caused to idle on the ground in order to avoid overspeed of the rotary wing.

In a version of the first and second embodiments, a clutch may be interposed between the secondary engine and the main gearbox, said inhibit means including means for declutching said clutch.

The clutch is then declutched on the ground.

In addition to an aircraft, the invention also provides a method of driving rotation of a main gearbox driving rotation of a rotary wing of an aircraft, said aircraft having a first main engine and a second main engine driving said main gearbox, said aircraft being provided with a main regulation system regulating the first main engine and the second main engine in application of a setpoint that is variable.

With an aircraft as described above, a secondary engine is provided to drive said main gearbox, and the secondary engine is regulated in application of a setpoint that is constant by means of a secondary regulation system that is independent of said main regulation system.

This method may also include one or more of the following characteristics.

For example, it is possible to regulate the secondary engine so that the reactivity of the secondary engine is shorter than the reactivity of the main engine, and then so that the reaction time of the secondary engine is greater than the reaction time of the main engines.

It is also possible to regulate the secondary engine as a function of a constant setpoint that may either be a fixed power setpoint or else a fixed fuel flow rate setpoint.

In a first implementation, said secondary engine develops maximum power that is insufficient for putting said rotary wing into overspeed on the ground, and:

on starting the aircraft, the secondary engine and the main engines are put into operation on the ground in order to drive the rotary wing; and when the aircraft is flying at a forward speed faster than a threshold forward speed or when the rotary wing exceeds a threshold speed of rotation and/or when the power necessary for driving the rotary wing is less than the available power delivered by the secondary engine, the secondary engine is inhibited.

In a second implementation, said secondary engine develops maximum power that is sufficient for putting said rotary wing into overspeed:

on the ground, the main engines are caused to operate to drive the rotary wing and the secondary engine is inhibited; and in flight, when the aircraft is flying at a forward speed slower than a threshold speed and when the speed of rotation of the rotary wing is less than a threshold speed of rotation and/or when the power needed for driving the rotary wing is greater than the available power delivered by the secondary engine, the secondary engine is no longer inhibited.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which.

Elements shown in more than one of the figures are given the same references in each of them.

DETAILED DESCRIPTION OF THE INVENTION

Figure 1:
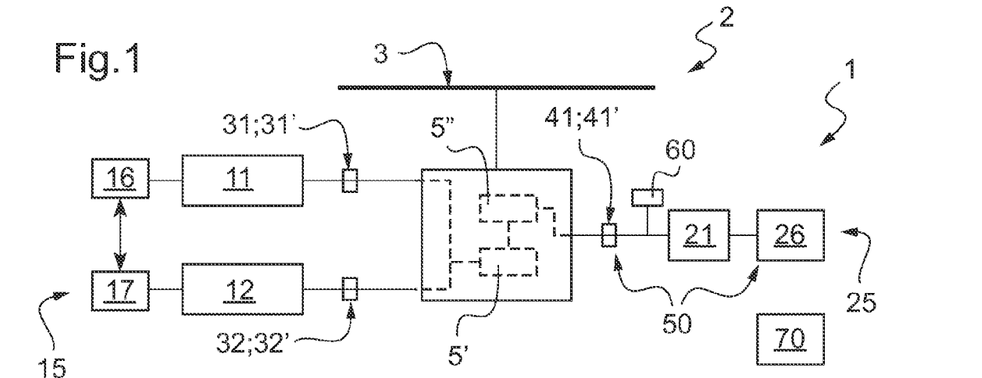
FIGS. 1 and 2 show variants of an aircraft of the invention.

FIG. 1 shows an aircraft 1 having a rotary wing 2 and at least one main gearbox 5 driving the rotary wing 2 in rotation.

The rotary wing may comprise at least one rotor 3 for providing lift and possibly also propulsion.

Nevertheless, the rotary wing may alternatively have a plurality of rotors. For example, the main gearbox 5 may drive one of the rotors via an additional gearbox.

Furthermore, the aircraft 1 is provided with three engines for driving the main gearbox 5.

Thus, the aircraft has a first main engine 11 and a second main engine 12, which may possibly be identical. These main engines 11 and 12 may be fuel-burning engines, such as free-turbine turboshaft engines. Each main engine is then provided with an outlet shaft connected to the main gearbox 5.

Each main engine 11, 12 may be operated at least at a normal utilization rating, and also at least one contingency rating.

Each main engine may possibly be certified to operate at a takeoff rating sometimes known as maximum takeoff power (maxTOP), at a continuous flight rating sometimes known as maximum continuous power (MCP), and at a transient rating sometimes known as maximum transient power (MTP). In addition, each main engine may be certified to operate at a continuous contingency rating sometimes known as one-engine operative (OEI), at a first supercontingency rating sometimes known as 2 minute OEI (OEI 2'), and at a second supercontingency rating sometimes known as 30 second OEI (OEI 30").

According to the invention, a single contingency rating may suffice.

A separation system may be interposed between the outlet shaft of each main engine and the main gearbox. Such a system may include at least one over-running clutch or "freewheel" 31, 32 and/or at least one ordinary clutch 31', 32', or indeed a system for reducing speed to one or more speeds of rotation of the gearbox type.

The aircraft also has a main regulation system 15 for regulating the main engine in application of a variable setpoint. For example, the main regulation system may use a speed of rotation setpoint NTL for a free turbine of a main engine. This setpoint varies depending on the current utilization rating of an engine as a function of the power it is to deliver and of constraints external to the aircraft, for example, or indeed of the conditions of utilization of the other engine.

The main regulation system 15 may comprise a first main control unit 16 regulating the first main engine 11 and a second main control unit 17 regulating the second main engine 12. The first main control unit 16 possibly communicates with the second main control unit 17.

The aircraft also has a secondary engine 21 for driving the main gearbox 5. This secondary engine may be a fuel-burning engine or an electric motor, and it may be identical to the main engine or it may be different therefrom. The secondary engine 21 may in particular have a reactivity that is shorter than the reactivity of the main engine 11, 12, and then a reaction time for acceleration and deceleration that is greater than the reaction time of the main engine 11 and 12.

The secondary engine may be dimensioned to deliver power that is less than the power that can be developed by a main engine.

With reference to the variant of FIG. 1, the secondary engine may be connected to the main gearbox 5.

The main gearbox 5 usually has a plurality of stages 5', 5" for reducing speed of rotation. If the main and secondary engines have different characteristics, the main engines 11 and 12 may be connected to a first speed reduction stage 5' that is adapted to their characteristics, while the secondary engine 21 is connected to a second speed reduction stage 5" that is adapted to its specific characteristics.

Figure 2:
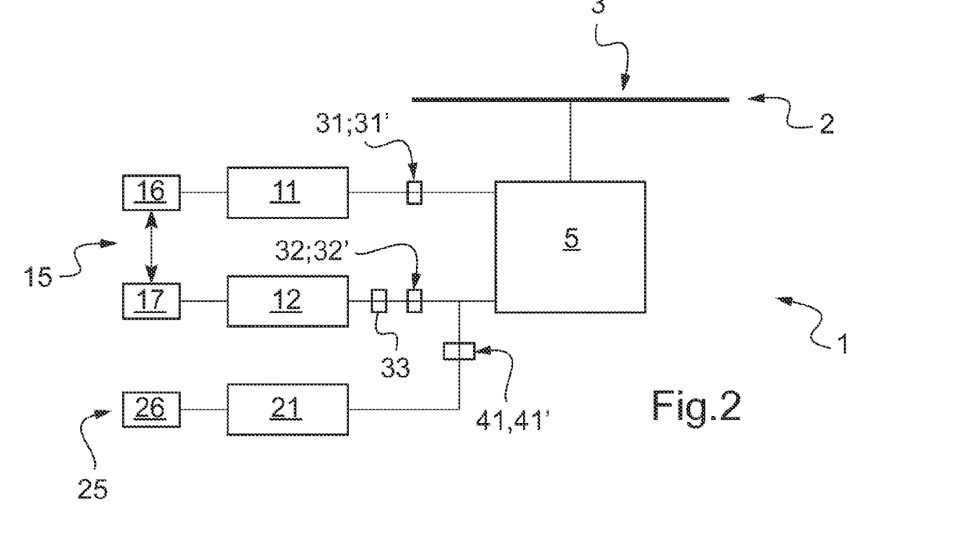

With reference to the variant of FIG. 2, the secondary engine 21 may be arranged in parallel with one of the main engines.

If the main and secondary engines have different characteristics, a speed-reducing gearbox 33 may be arranged at the outlet from the main engine that co-operates with the secondary engine.

Independently of the variant, the secondary engine preferably operates at a single rating. Nevertheless, it is possible for the secondary engine 21 to be associated with a plurality of ratings, e.g. in order to adapt to various types of mission or to various types of aircraft.

Under such circumstances, the aircraft 1 has a secondary regulation system 25 for regulating the secondary engine 21. For an ordinary utilization rating of the secondary engine, the secondary regulation system 25 controls the secondary engine so as to cause it to tend towards a constant setpoint, unlike the regulation applied to the main engine.

This setpoint does not vary during the time the current rating is in use. It can be understood that the term "regulation at a constant setpoint" is used to mean applying a fixed setpoint for the current utilization rating.

For example, the secondary engine may be dimensioned to be regulated in power, and it may operate at first and second ratings that are associated with respective powers of 200 kilowatts (kW) and 400 kW.

During application of the first rating, the regulation tends to maintain the power developed by the secondary engine at a constant setpoint that is fixed at 200 kW. If a pilot changes the rating to be applied to the secondary engine in order to apply the second rating, then the regulation tends to maintain the power developed by the secondary engine at a constant setpoint fixed at 400 kW. It nevertheless remains that the regulation acts always to apply a setpoint that is constant and thus fixed.

The secondary regulation system 25 is thus independent of the main regulation system 15.

The secondary regulation system 25 described has a secondary control unit 26 for controlling the secondary engine 21, the secondary control unit 26 not having any connection with the main engines 16 and 17.

Figure 3:
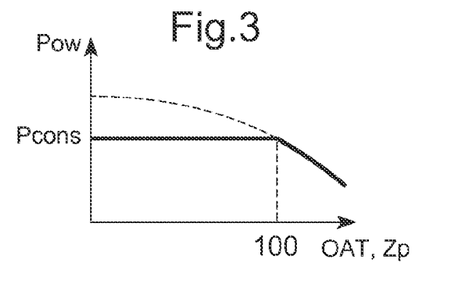
FIGS. 3 and 4 are diagrams relating to variant ways of regulating the secondary engine.
Figure 4:
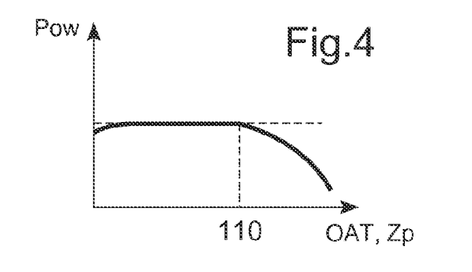

FIGS. 3 and 4 are graphs plotting external conditions such as outside air temperature OAT and/or the altitude of the aircraft along the abscissa axis, and the power developed by the secondary engine up the ordinary axis.

With reference to FIG. 3, the setpoint may thus be a power setpoint. Nevertheless, it can be understood that beyond a threshold 100 the secondary engine is no longer capable of delivering the setpoint power PCONS given the exterior conditions OAT and/or the altitude of the aircraft.

With reference to FIG. 4, the setpoint may be a fixed fuel flow rate setpoint determined so as to deliver a predefined power at the design point 110 of the aircraft. The power delivered by the secondary engine then varies as a function of the exterior conditions OAT and/or the altitude of the aircraft.

Furthermore, and with reference to FIG. 1, a disconnect system is installed between the secondary engine 21 and the main gearbox 5. Such a system may include at least one freewheel 41 and/or at least one clutch 41', or even a rotary speed reduction system having one or more speeds, of the gearbox type.

Furthermore, the aircraft may include deactivation means 50 for deactivating the secondary engine 21. Such deactivation means 50 may include a disconnection system or indeed the secondary control unit.

Figure 5:
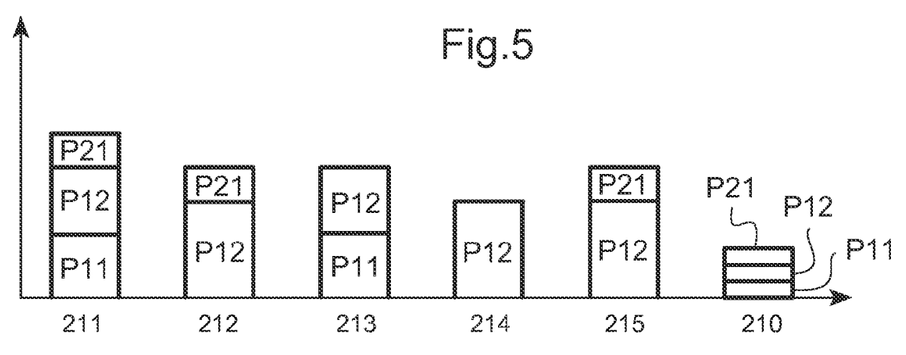
FIG. 5 is a diagram explaining the operation of a first embodiment of the invention.
Figure 6:
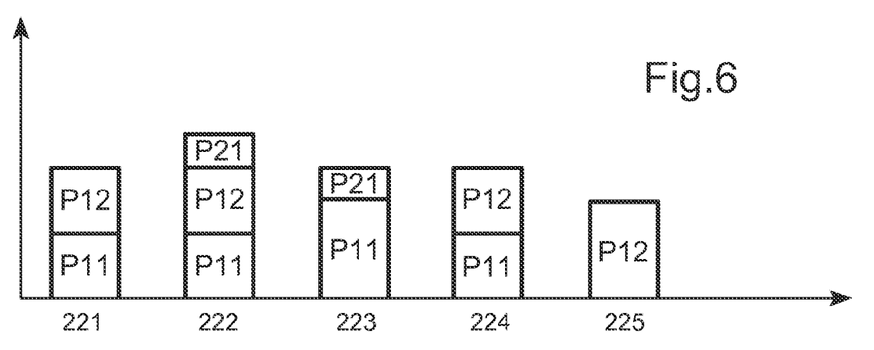
FIG. 6 is a diagram explaining the operation of a second embodiment of the invention.

FIGS. 5 and 6 are diagrams for explaining the operation of the aircraft in first and second embodiments. Each of these FIGS. 5 and 6 are diagrams plotting the power developed by the engines up the ordinate axis, for a variety of flight situations. The powers as developed by the first main engine, by the second main engine, and by the secondary engine are given respective references P11, P12, and P21 in FIGS. 5 and 6.

Independently of the embodiment, it can be understood that the method applied suggests installing a secondary engine 21 for driving the main gearbox 5 and regulating the secondary engine 21 in application of a constant setpoint by using a secondary regulation system 25 that is independent of the main regulation system 15.

The secondary engine 21 may optionally be regulated so that the reactivity of the secondary engine 21 is shorter than the reactivity of the main engine 11, 12, and then so that the reaction time the reaction time of the secondary engine 21 is greater than the reaction time of the main engines 11, 12.

Furthermore, by way of example, it is possible to regulate the secondary engine 21 as a function either of a fixed power setpoint or else of a fixed fuel flow rate setpoint.

In the first embodiment, the secondary engine 21 is dimensioned so as to develop low maximum power. This maximum power is said to be "low" insofar as this maximum power is not sufficient to lead to overspeed of the rotary wing 2 when the main engines are stopped or idling.

Under such circumstances, the secondary engine may be started on the ground without any risk of leading to overspeed of the rotary wing.

In a first situation 210, the secondary engine 21 and the main engines 11 and 12 are caused to operate on the ground in order to drive the rotary wing 2. Since the main engines are regulated in application of a setpoint that is variable, the main regulation system must guarantee that the main and secondary engines will not generate overspeed of the rotary wing.

It is possible for the main engines to develop zero power on the ground.

The secondary engine optionally has a specific free turbine mode of regulation on the ground that is dedicated to generating electricity in a declutched mode, for the purpose of driving electricity generators that are mechanically connected to the free turbine.

The secondary engine may optionally have a specific mode of regulating on the ground the gas generator that is dedicated to generating electricity in declutched mode, in order to drive the electricity generators that are mechanically connected to the gas generator.

When the aircraft 1 is flying at a forward speed greater than a forward speed threshold, or when the rotary wing exceeds a threshold speed of rotation, the secondary engine 21 is inhibited.

Conversely, while the aircraft 1 is in flight at a forward speed less than a threshold speed and/or while the speed of rotation of the rotary wing is less than a threshold speed of rotation, the secondary engine 21 is not inhibited.

Thus, during a stage 211 of taking off or of hovering, the secondary engine 21 is in operation.

Nevertheless, if the speed of rotation of the rotary wing exceeds the threshold speed of rotation, the secondary engine is inhibited. The secondary regulation system then causes the secondary engine to idle or to stop.

The threshold speed of rotation may be less than the speed corresponding to overspeed of the rotary wing, while nevertheless being greater than the nominal speed of rotation of the rotary wing.

In the event of a main engine failing, as represented by configuration 212, the other main engine may then be regulated to deliver a contingency power, and the secondary engine remains active in driving the rotary wing.

In contrast, during ordinary forward flight as represented by configuration 213, the secondary engine is inhibited.

In the event of a failure of a main engine as represented by configuration 214, the other main engine may then be regulated to deliver contingency power as shown in configuration 214. If necessary, and in addition, it is also possible to assist the main engine that remains in operation by using the secondary engine 21 in configuration 215.

With a secondary engine that develops moderate power in comparison with the main engines, it is found that it is possible in the failure configuration 215 to develop total power that is equal to the total power reached in the absence of failure, as represented by the configuration 213.

In a second embodiment, the secondary engine 21 is dimensioned so as to develop high maximum power. This maximum power is said to be "high" insofar as this maximum power is sufficient to give rise to overspeed of the rotary wing 2 when the main engines are stopped or idling.

Under such circumstances, the main engines are operated on the ground to drive the rotary wing and the secondary engine is inhibited so long as the aircraft is flying at an altitude below a threshold altitude or whenever the rotary wing exceeds a threshold speed of rotation.

When the aircraft is flying at a forward slower than a threshold speed and at an altitude higher than a threshold altitude, the secondary engine is no longer inhibited.

With reference to FIG. 1, the aircraft 1 has detection means 70 for detecting whether the aircraft is standing on the ground. By way of example, the detection means 70 comprise a radioaltimeter or a sensor arranged on landing gear.

The aircraft 1 is optionally provided with a detection system for detecting whether the aircraft is traveling at a forward speed faster than a threshold forward speed and/or whether the rotary wing has exceeded a threshold speed of rotation. By way of example, the detection system is provided with conventional means for measuring the forward speed of the aircraft, with means for measuring the speed of rotation of the rotary wing, and/or with means for determining the power delivered by the secondary engine, and/or means for determining the power needed for driving the rotary wing.

In addition, the aircraft possesses inhibit means for inhibiting the secondary engine when at least one of the following three conditions is satisfied:

the aircraft is standing on the ground;

the aircraft has a forward speed faster than a threshold forward speed; and the speed of rotation of the rotary wing exceeds a threshold speed of rotation or the power needed for driving the rotary wing is less than the available power delivered by the secondary engine.

Depending on the version, the inhibit means may include brake means 60 for braking the secondary engine.

Alternatively, a freewheel 41 is interposed between the secondary engine 21 and the main gearbox 5, and the inhibit means comprise means for slowing down or stopping the secondary engine in order to avoid overspeed.

In contrast, if a clutch 41' is interposed between the secondary engine 21 and the main gearbox 5, the inhibit means comprise means for declutching the clutch. The secondary engine may then have a mode of regulation that is specific for declutched mode.

Inhibition of the secondary engine may be applied automatically, e.g. via the secondary regulation system, and/or it may be applied manually.

In FIG. 6 and configuration 221, the secondary engine is inhibited on the ground.

In the presence of a freewheel, the secondary engine is idling or stopped.

In the presence of a clutch, the secondary engine may be idling, stopped, or in a mode of regulation that is specific for generating electricity.

Takeoff is performed by making use solely of the main engine for driving the rotary wing up to a height at which the aircraft remains in the ground effect zone. If an engine fails, the aircraft is close enough to the ground to land.

Once the aircraft has taken off, use is made of the secondary engine.

In flight, the secondary engine can then be used whenever the aircraft is flying at a forward speed slower than a threshold speed in configuration 222, and whenever the power delivered by the secondary engine is less than the power required by the rotary wing.

The secondary engine is then in a position for flying, and an optional clutch, if any, is engaged.

Optionally, proper operation of the main and secondary engines may be verified while in the ground effect zone, either by the pilot or by the avionics system of the aircraft.

In the event of a main engine failing, as represented by configuration 223, the other main engine may then be regulated to deliver contingency power, while the secondary engine remains active in driving the rotary wing.

In contrast, during ordinary forward flight as represented by configuration 224, the secondary engine is inhibited. The aircraft is then flying at a forward speed faster than the threshold speed.

In the event of a failure of a main engine, as represented by configuration 225, the other main engine may then be regulated to deliver contingency power. If necessary, and in addition, it is also possible to assist the main engine that remains in operation with the secondary engine 21.

On landing, the three engines deliver the required power. The forward speed of the aircraft is then less than the threshold forward speed.

When the altitude of the aircraft reaches the ground, the secondary engine is inhibited, either by being stopped or being caused to idle. Depending on the variant, it is considered that the ground has been reached when the aircraft come into contact with the ground or when the aircraft is lower than a threshold radioaltimeter altitude.

In this latter configuration, final landing, down to making contact with the ground, is then performed using the two main engines 11, 12.

On touching the ground, at full low pitch of the blades of the rotary wing, the state of the secondary engine is verified by the pilot or by the avionics of the aircraft in order to verify that it is idling or stopped.

On the ground, and in the version having a clutch, the secondary engine may be inhibited in the flight state (by being regulated to a fixed setpoint) while being declutched, or it may be regulated in the manner specific to generating electricity.

Naturally, the present invention may be subjected to numerous variations as to the way it is embodied. Although several embodiments are described, it will readily be understood that it is not conceivable to identify exhaustively all possible embodiments. It is naturally possible to envisage replacing any of the means described by equivalent means without going beyond the ambit of the present invention.

For example, the secondary engine may be started or used continuously during a flight, or it may be used intermittently in application of alternative procedures.

What is claimed is:

1. An aircraft having a rotary wing and at least one main gearbox for driving rotation of the rotary wing, the aircraft having a first main engine and a second main engine driving the main gearbox, the aircraft being provided with a main regulation system regulating the first main engine and the second main engine in application of a setpoint that is variable, wherein the aircraft is provided with a secondary engine driving the main gearbox, the aircraft having a secondary regulation system that regulates the secondary engine in application of a setpoint that is constant, the secondary regulation system being independent of the main regulation system.

2. An aircraft according to claim 1, wherein the main regulation system comprises a first main control unit for controlling the first main engine and a second main control unit for controlling the second main engine, the first main control unit communicating with the second main control unit, the secondary regulation system including a secondary control unit for controlling the secondary engine, the secondary control unit having no connection with the first and second main control units.

3. An aircraft according to claim 1, wherein the secondary engine presents a reactivity that is shorter than a reactivity of the main engines.

4. An aircraft according to claim 1, wherein the main engines are identical, the secondary engine being different from the main engines.

5. An aircraft according to claim 4, wherein the main gearbox has a plurality of stages for reducing speed of rotation, the main engines are connected to a first speed reduction stage, and the secondary engine is connected to a second speed reduction stage.

6. An aircraft according to claim 1, wherein each main engine has a single contingency operating rating.

7. An aircraft according to claim 1, wherein the secondary engine has at least two operating ratings, each regulated as a function of a respective setpoint that is constant.

8. An aircraft according to claim 1, wherein the setpoint that is constant is either (i) a fixed power setpoint or (ii) a fixed fuel flow rate setpoint when the secondary engine is a fuel-burning engine.

9. An aircraft according to claim 1, wherein the aircraft includes deactivation means for deactivating the secondary engine.

10. An aircraft according to claim 1, wherein the secondary engine develops maximum power that is not sufficient for putting the rotary wing into overspeed when on the ground.

11. An aircraft according to claim 1, wherein the secondary engine develops maximum power that is sufficient to put the rotary wing into overspeed, and the aircraft includes detection means to detect whether the aircraft is on the ground, the aircraft having inhibit means for inhibiting the secondary engine on the ground.

12. An aircraft according to claim 1, wherein the aircraft may include a detection system for detecting whether the aircraft has a forward speed faster than a threshold forward speed and/or whether the rotary wing is exceeding a threshold speed of rotation, the aircraft having inhibit means for inhibiting the secondary engine when the aircraft possesses a forward speed that is faster than a threshold forward speed and/or when the rotary wing exceeds a threshold speed of rotation and/or when power needed for driving the rotary wing is less than available power delivered by the secondary engine.

13. An aircraft according to claim 11, wherein the inhibit means comprise brake means for braking the secondary engine.

14. An aircraft according to claim 11, wherein a freewheel is interposed between the secondary engine and the main gearbox, and the inhibit means comprise means for causing the secondary engine to idle or stop.

15. An aircraft according to claim 11, wherein a clutch is interposed between the secondary engine and the main gearbox, and the inhibit means comprise means for declutching the clutch.

16. A method of driving rotation of a main gearbox driving rotation of a rotary wing of an aircraft, the method comprising:
regulating a first main engine and a second main engine of the aircraft with a main regulation system by applying a setpoint that is variable, the first main engine and the second main engine driving the main gearbox; and
regulating a secondary engine of the aircraft with a secondary regulation system by applying a setpoint that is constant, the secondary engine driving the main gearbox, and wherein the secondary regulation system is independent of the main regulation system.

17. A method according to claim 16, wherein the secondary engine is regulated so that a reactivity of the secondary engine is shorter than a reactivity of the main engines.

18. A method according to claim 16, wherein the secondary engine is regulated as a function either (i) of a fixed power setpoint, or iii) of a fixed fuel flow rate setpoint when the secondary engine is a fuel-burning engine.

19. A method according to claim 16, wherein the secondary engine develops maximum power that is insufficient for putting the rotary wing into overspeed on the ground, and:
on starting the aircraft, the secondary engine and the main engines are put into operation on the ground in order to drive the rotary wing; and
when the aircraft is flying at a forward speed faster than a threshold forward speed or when the rotary wing exceeds a threshold speed of rotation and/or when power necessary for driving the rotary wing is less than available power delivered by the secondary engine, the secondary engine is inhibited.

20. A method according to claim 16, wherein the secondary engine develops maximum power that is sufficient for putting the rotary wing into overspeed:
on the ground, the main engines are caused to operate to drive the rotary wing and the secondary engine is inhibited; and
in flight, when the aircraft is flying at a forward speed slower than a threshold speed and when the speed of rotation of the rotary wing is less than a threshold speed of rotation and/or when power needed for driving the rotary wing is greater than available power delivered by the secondary engine, the secondary engine is no longer inhibited.

21. An aircraft comprising:
at least one main gearbox for driving rotation of a rotary wing;
a first main engine and a second main engine driving the main gearbox;
a main regulation system to regulate the first main engine and the second main engine in application of a setpoint that is variable;
a secondary engine driving the main gearbox, wherein the secondary engine develops a maximum power sufficient to put the rotary wing into overspeed;
a secondary regulation system to regulate the secondary engine in application of a setpoint that is constant, wherein the secondary regulation system is independent of the main regulation system;
detection means to detect whether the aircraft is on the ground; and
inhibit means for inhibiting the secondary engine when the aircraft is on the ground.

* * * * *